(12) United States Patent
Tsuzaki et al.

(10) Patent No.: US 11,083,987 B2
(45) Date of Patent: Aug. 10, 2021

(54) PHOTOCATALYTIC FILTER AND PHOTOCATALYTIC DEVICE

(71) Applicant: Toshiba Lighting & Technology Corporation, Yokosuka (JP)

(72) Inventors: Osamu Tsuzaki, Yokosuka (JP); Akihiro Yagi, Yokosuka (JP)

(73) Assignee: Toshiba Lighting & Technology Corporation, Yokosuka (JP)

( * ) Notice: Subject to any disclaimer, the term of this patent is extended or adjusted under 35 U.S.C. 154(b) by 137 days.

(21) Appl. No.: 16/523,565

(22) Filed: Jul. 26, 2019

(65) Prior Publication Data

US 2020/0094179 A1 Mar. 26, 2020

(30) Foreign Application Priority Data

Sep. 21, 2018 (JP) .............................. JP2018-177685

(51) Int. Cl.
| | | |
|---|---|---|
| *B01D 39/08* | (2006.01) | |
| *B01D 39/20* | (2006.01) | |
| *B01D 35/00* | (2006.01) | |
| *B01D 35/06* | (2006.01) | |
| *B01D 53/88* | (2006.01) | |
| *B01J 35/00* | (2006.01) | |
| *B01J 35/06* | (2006.01) | |

(52) U.S. Cl.
CPC ....... *B01D 39/2017* (2013.01); *B01D 39/086* (2013.01); *B01D 53/885* (2013.01); *B01J 35/004* (2013.01); *B01J 35/06* (2013.01); *B01D 2255/802* (2013.01)

(58) Field of Classification Search
CPC ........................ B01D 39/086; B01D 39/2017; B01D 35/004; B01D 35/06; B01D 53/885; B01D 2255/802
See application file for complete search history.

(56) References Cited

U.S. PATENT DOCUMENTS

| | | | | |
|---|---|---|---|---|
| 2,311,573 | A * | 2/1943 | Shoan | F16L 58/16 428/172 |
| 4,838,905 | A * | 6/1989 | Billiet | B01D 39/2017 156/86 |
| 5,215,003 | A * | 6/1993 | Soubeyrat | A01J 25/162 428/172 |
| 7,810,525 | B2 * | 10/2010 | Schneider | D02G 3/047 139/383 R |
| 8,388,718 | B2 * | 3/2013 | Gutsche | B01D 39/1692 55/486 |
| 8,393,477 | B2 * | 3/2013 | Kamleiter | B01D 69/08 210/489 |

FOREIGN PATENT DOCUMENTS

JP 2010-240053 A 10/2010

* cited by examiner

*Primary Examiner* — Cam N. Nguyen
(74) *Attorney, Agent, or Firm* — Banner & Witcoff, Ltd.

(57) ABSTRACT

A photocatalytic filter may include: a plurality of weft threads each of which includes a plurality of fibers extending in a first direction; a plurality of warp threads each of which includes a plurality of fibers extending in a second direction intersecting the first direction; and photocatalysts which are carried by the plurality of weft threads and the plurality of warp threads. At least two warp threads sandwiches at least one weft thread or at least two weft threads sandwiches at least one warp thread at the intersection portion between the weft thread and the warp thread.

17 Claims, 4 Drawing Sheets

PHOTOCATALYTIC FILTER AND PHOTOCATALYTIC DEVICE

CROSS-REFERENCE TO RELATED APPLICATIONS

This application is based upon and claims the benefit of priority from Japanese Patent Application No. 2018-177685, filed on Sep. 21, 2018; the entire contents of which are incorporated herein by reference.

FIELD

Embodiments described herein relate to a photocatalytic filter and a photocatalytic device.

BACKGROUND

Since there is a rise in health awareness, it is highly required to purify air in so-called semi-closed spaces such as spaces in cars, spaces in refrigerators, and living spaces. For example, it is frequently required to remove ammonia and ethylene produced from food, remove volatile organic compounds (VOCs) such as acetaldehyde contained in tobacco smoke, or sterilize and inactivate viruses. For that reason, there is proposed a photocatalytic device including a light source provided with a plurality of light-emitting diodes and a photocatalytic filter carrying photocatalysts.

In general, a plurality of light-emitting diodes are mounted on a substrate. Further, the substrate is provided with a plurality of holes for circulating a gas. Further, the substrate is provided to face the photocatalytic filter. A gas containing materials to be treated passes through the holes provided in the substrate and reaches the photocatalytic filter. Light emitted from the plurality of light-emitting diodes is incident to the photocatalysts carried by the photocatalytic filter so that reactive oxygen species and the like are produced. For that reason, when the gas reaching the photocatalytic filter passes through the photocatalytic filter, materials contained in the gas are treated by reactive oxygen species and the like.

Here, if pressure loss generated when the gas passes through the photocatalytic filter increases, the flow of the gas is disturbed. For that reason, there is concern that the throughput of the photocatalytic device may be remarkably decreased.

Therefore, there is a demand for developing a technique capable of reducing pressure loss generated when the gas passes through the photocatalytic filter.

DETAILED DESCRIPTION

Figure 1:
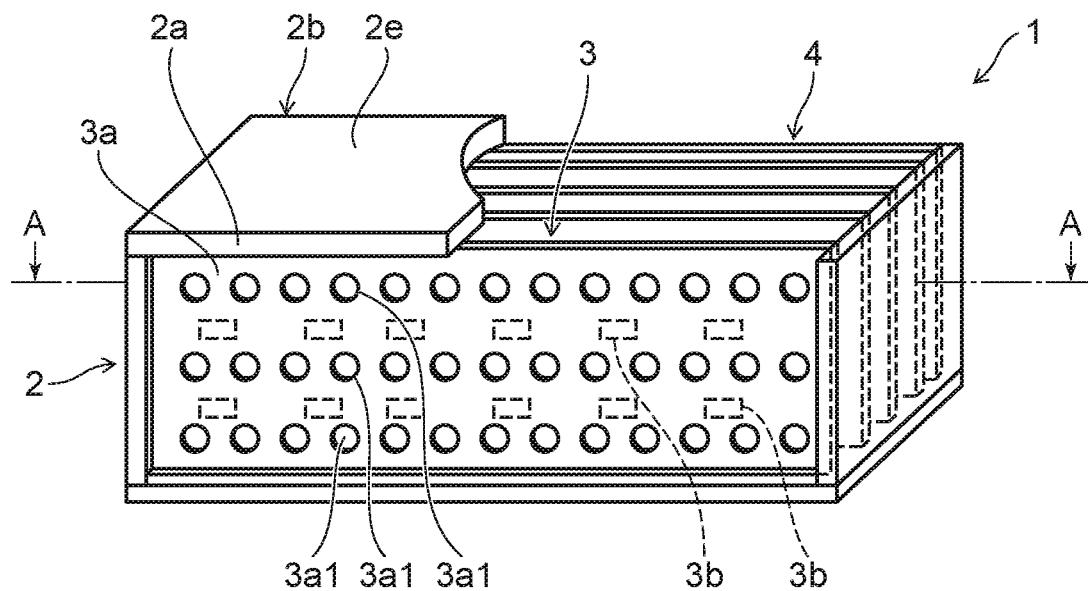
FIG. 1 is a schematic perspective view illustrating a photocatalytic device of the embodiment.

A photocatalytic filter according to an embodiment includes: a plurality of weft threads each of which includes a plurality of fibers extending in a first direction; a plurality of warp threads each of which includes a plurality of fibers extending in a second direction intersecting the first direction; and photocatalysts which are carried by the plurality of weft threads and the plurality of warp threads. At least two warp threads sandwiches at least one weft thread or at least two weft threads sandwiches at least one warp thread at the intersection portion between the weft thread and the warp thread.

Hereinafter, embodiments will be exemplified with reference to the drawings. Furthermore, in the drawings, the same components will be denoted by the same reference numerals and a detailed description thereof will be appropriately omitted.

FIG. 1 is a schematic perspective view illustrating a photocatalytic device 1 according to the embodiment.

Figure 2:
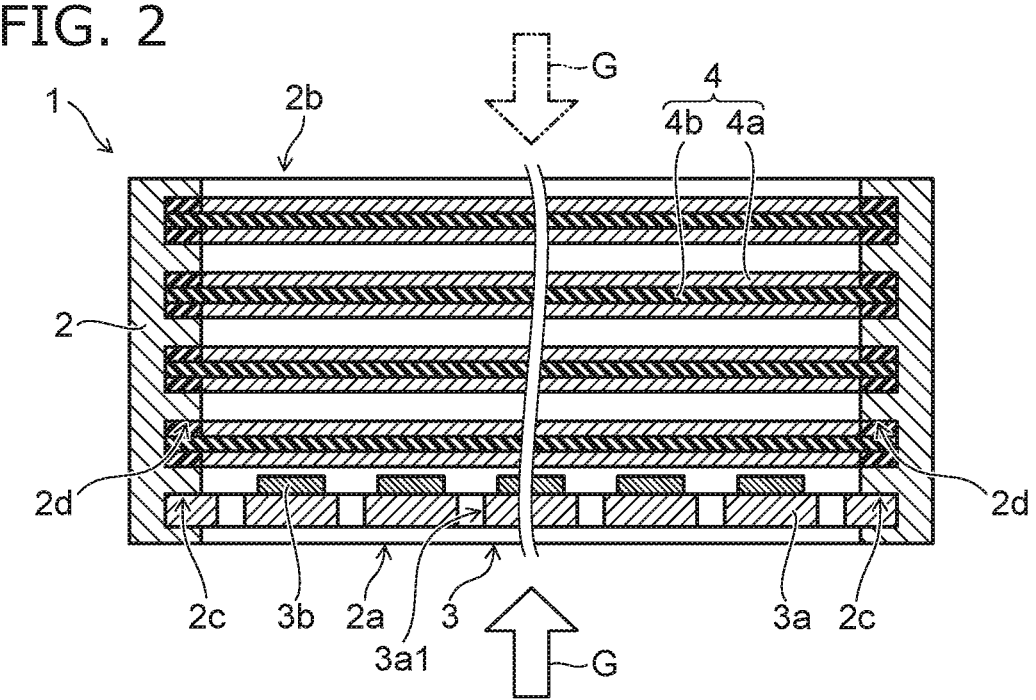
FIG. 2 is a schematic cross-sectional view taken along a line A-A of the photocatalytic device of FIG. 1.

FIG. 2 is a schematic cross-sectional view taken along a line A-A of the photocatalytic device 1 of FIG. 1.

Figure 3A:
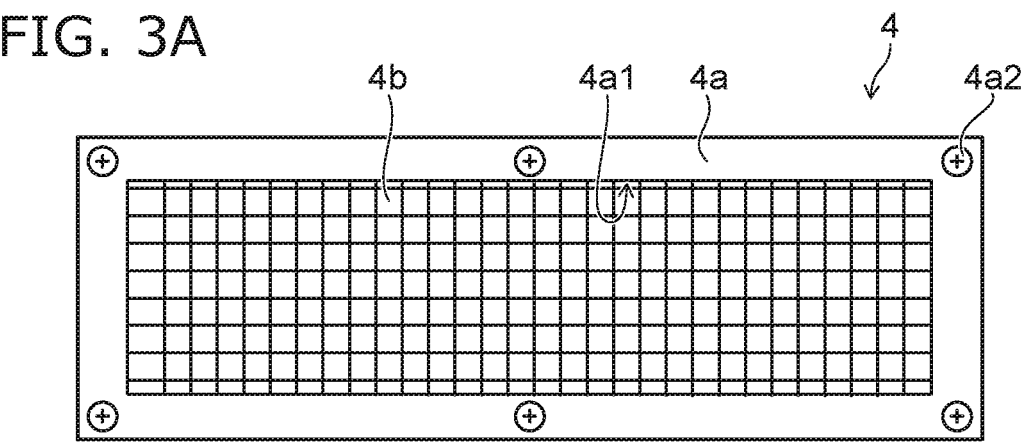
FIG. 3A is a schematic plan view of a photocatalytic filter and FIG. 3B is a schematic side view of the photocatalytic filter.

FIG. 3A is a schematic plan view of a photocatalytic filter 4.

Figure 3B:
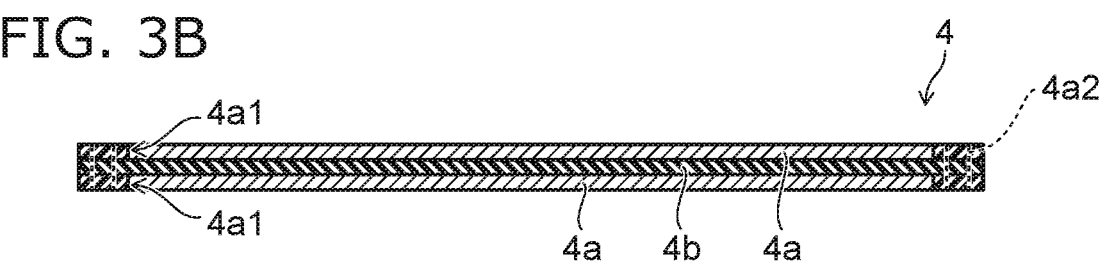

FIG. 3B is a schematic side view of the photocatalytic filter 4.

As illustrated in FIGS. 1 and 2, the photocatalytic device 1 can be provided with a casing 2, a light source 3, and a photocatalytic filter 4.

The casing 2 can have a cylindrical shape. The casing 2 illustrated in FIGS. 1 and 2 has a square cylindrical shape in cross-sectional view, but the casing is not limited thereto. The casing 2 may have a configuration in which a gas flow path is provided inside the casing. For example, the cross-section of the casing 2 may have a cylindrical shape of a circle, an oval, or a polygon. Here, the photocatalytic filter 4 may have a square shape in plan view if the casing 2 has a square cylindrical shape in cross-sectional view. For that reason, it is easy to manufacture or attach and detach the photocatalytic filter 4.

The material of the casing 2 is not particularly limited. Here, the casing 2 can be formed by injection-molding if the material of the casing 2 is thermoplastic resin. In this case, if the material of the casing 2 is acrylic resin (polymethyl methacrylate resin), it is possible to improve the resistance to ultraviolet light emitted from the light source 3 and the resistance to VOC contained in the gas. Furthermore, if the polymerization degree of the acrylic resin is set to about 10000 to 15000, odor can be suppressed.

Further, if the material of the casing 2 is acrylonitrile-butadiene-styrene resin (ABS resin), formability can be improved and cost can be reduced. In this case, if the material of the casing 2 is reinforced ABS resin, the strength of the casing 2 can be improved. Furthermore, the reinforced ABS resin is obtained by mixing glass fibers and the like with ABS resin.

Further, the material of the casing 2 can be metal. If the material of the casing 2 is metal, the rigidity of the photocatalytic device 1 can be improved. The metal can be, for example, iron, stainless steel, aluminum alloy, or the like.

One end portion 2a of the casing 2 and the other end portion 2b of the casing 2 can be opened. For example, the end portion 2a of the casing 2 can be an inlet of a gas G. The end portion 2b of the casing 2 can be an outlet of the gas G. Furthermore, the end portion 2a may be the outlet of the gas G and the end portion 2b may be the inlet of the gas G. That is, the flow direction of the gas G is not particularly limited. The gas G can be, for example, a gas containing air as a main component.

An inner wall of the casing 2 can be provided with a plurality of concave portions 2c and a plurality of concave portions 2d.

An end portion of a substrate 3a can be inserted into the concave portion 2c. One substrate 3a (light source 3) can be held by the pair of concave portions 2c. An end portion of the photocatalytic filter 4 can be inserted into the concave portion 2d. One photocatalytic filter 4 can be held by the pair of concave portions 2d.

Further, the concave portion 2d can be provided in substantially parallel to the concave portion 2c. For that reason, the photocatalytic filter 4 can be provided in substantially parallel to the substrate 3a of the light source 3. A lid 2e provided in the extension direction of the concave portions 2c and 2d in the casing 2 can be attached to and detached from the casing 2. If the lid 2e is provided in an attachable and detachable manner, it is easy to attach and detach the light source 3 and the photocatalytic filter 4.

In addition, a grid can be provided in the end portions 2a and 2b of the casing 2 so as to prevent fingers and foreign matter from entering the casing 2. Further, a dustproof filter or the like may be provided in order to prevent dust and the like from entering the casing 2.

The light source 3 can include a substrate 3a and a light-emitting element 3b.

The substrate 3a can have a plate shape. One surface of the substrate 3a may be provided with a wiring pattern. The substrate 3a can be provided inside the casing 2. In the case illustrated in FIGS. 1 and 2, the substrate 3a is provided on the side of the end portion 2a. The substrate 3a can be provided to block an opening provided in the end portion 2a.

The substrate 3a is provided in the flow path of the gas G. For that reason, the substrate 3a can be provided with a plurality of holes 3a1 penetrating in the thickness direction. The plurality of holes 3a1 can be circulation ports of the gas G. In order to reduce pressure loss of the gas G, it is preferable to provide the hole 3a1 as large as possible. The diameter of the hole 3a1 can be set to, for example, about 3 mm to 4 mm. The number or arrangement of the holes 3a1 is not particularly limited. Here, it is preferable that the hole 3a1 overlap a space 4b2c provided in a carrier 4b2 when viewed from the side of the end portion 2a (2b) of the casing 2 (when the photocatalytic device 1 is viewed from the flow direction of the gas G). In this way, it is possible to suppress the flow of the gas G from being disturbed.

Furthermore, since the rigidity of the substrate 3a decreases if the dimension of the hole 3a1 is too large, the substrate 3a may be vibrated. Also in this case, a reinforced plate or the like formed of a high-rigid material such as metal may be fixed to the inner wall of the casing 2 and the substrate 3a may be provided in the reinforced plate or the like.

The material or structure of the substrate 3a is not particularly limited. For example, the substrate 3a can be formed of an inorganic material (ceramics) such as aluminum oxide or aluminum nitride or an organic material such as paper phenol or glass epoxy. Further, the substrate 3a may be obtained by coating the surface of the metal plate with an insulating material. Furthermore, when the surface of the metal plate is coated with the insulating material, the insulating material may be an organic material or an inorganic material.

When the heat dissipation amount of the light-emitting element 3b is large, it is preferable to form the substrate 3a by a high heat conductivity material from the viewpoint of thermal radiation. As the high heat conductivity material, for example, ceramics such as aluminum oxide and aluminum nitride, high heat conductivity resins, and those in which the surface of a metal plate is coated with an insulating material can be exemplified. The high heat conductivity resin can be, for example, one obtained by mixing fillers formed of aluminum oxide or carbon with resin such as Polyethylene terephthalate (PET) or nylon.

Further, the substrate 3a may have a single layer structure or a multilayer structure.

The light-emitting element 3b can be provided on one surface of the substrate 3a. The light-emitting element 3b can be electrically connected to the wiring pattern provided on the surface of the substrate 3a. The type of the light-emitting element 3b is not particularly limited. The light-emitting element 3b can be, for example, a light-emitting element of a surface mount type such as a Plastic Leaded Chip Carrier (PLCC) type. The light-emitting element 3b can be, for example, a light-emitting element having a bullet-shaped lead wire or the like.

Further, the light-emitting element 3b can be mounted by a Chip On Board (COB). In the case of the light-emitting element 3b mounted by the COB, the chip-like light-emitting element 3b, a wiring electrically connecting the light-emitting element 3b and the wiring pattern, and a sealing portion covering the wiring or the chip-like light-emitting element 3b can be provided on the substrate 3a.

The light-emitting element 3b can be, for example, a light-emitting diode. At least one light-emitting element 3b can be provided. Here, if the plurality of light-emitting elements 3b are provided, it is easy to irradiate light to a wide area of the photocatalytic filter 4. The plurality of light-emitting elements 3b can be connected in series. The arrangement of the plurality of light-emitting elements 3b is not particularly limited, but may be preferably provided almost uniformly on the surface of the substrate 3a. In this way, it is easy to uniformly irradiate light to the surface of the photocatalytic filter 4.

Here, the photocatalytic response speed is changed by the light intensity (light amount) and the absorbing wavelength region of a photocatalyst 4b1. For that reason, the arrangement or number of the plurality of light-emitting elements 3b can be determined on the basis of the light amount of the light irradiated by one light-emitting element 3b, the area of the photocatalytic sheet 4b carrying the photocatalyst 4b1, and the distance between the light emitting surface of the light-emitting element 3b and the photocatalytic filter 4 closest to the light source 3.

For example, it is possible to set the arrangement or number of the plurality of light-emitting elements 3b so that the light irradiation intensity on the photocatalytic filter 4 closest to the light source 3 becomes 1 mW/cm$^2$ or more.

The light-emitting element 3b can irradiate light having a predetermined wavelength toward the photocatalyst 4b1 carried by the carrier 4b2 of the photocatalytic sheet 4b. In this case, if the material or composition of the photocatalyst 4b1 is changed, the absorbing wavelength region of the photocatalyst 4b1 changes. For that reason, it is possible to appropriately select the light-emitting element 3b irradiating light of an appropriate wavelength in response to the absorbing wavelength region of the photocatalyst 4b1.

For example, when the photocatalyst 4b1 is an ultraviolet light responsive photocatalyst 4b1 such as titanium oxide, the light-emitting element 3b can irradiate light having a peak wavelength of 380 nm or less. Further, when the photocatalyst 4b1 is a visible light responsive photocatalyst 4b1 such as tungsten oxide, the light-emitting element 3b can irradiate light having a peak wavelength of 380 nm or more (for example, about 400 nm to 600 nm). In this case, a plurality of light-emitting elements 3*b* having the same peak wavelength or different peak wavelengths can be provided.

As will be described later, the photocatalyst 4*b*1 can decompose and remove harmful materials contained in the gas G and sterilize and inactivate viruses by the photocatalytic action.

At least one photocatalytic filter 4 can be provided. When the plurality of photocatalytic filters 4 are provided, the plurality of photocatalytic filters 4 can be provided side by side between the end portion 2*a* and the end portion 2*b* of the casing 2. The photocatalytic filters 4 can be provided side by side with the light source 3. The photocatalytic filters 4 can be provided side by side with the light source 3 on the side where the light-emitting element 3*b* of the substrate 3*a* is provided. The number of the photocatalytic filters 4 is not particularly limited. The number of the photocatalytic filters 4 can be appropriately changed in response to the flow rate of the gas G, the amount of the material contained in the gas G, the light intensity (light amount) of the light irradiated from the light source 3, and the like.

Here, if both surfaces of the substrate 3*a* are provided with the light-emitting element 3*b*, the light source 3 can be provided between the photocatalytic filter 4 and the photocatalytic filter 4. As the distance between the light source 3 and the photocatalytic filter 4 increases or the number of other photocatalytic filters 4 between the light source 3 and the photocatalytic filter 4 increases, the photocatalytic response speed becomes slower. In this case, if the photocatalytic filter 4 is provided on both sides of the light source 3, the distance between the light source 3 and the photocatalytic filter 4 farthest from the light source 3 can be shortened. Further, the number of other photocatalytic filters 4 provided between the light source 3 and the photocatalytic filter 4 can be decreased. For that reason, the photocatalytic response speed can be easily faster.

Further, when the plurality of photocatalytic filters 4 are provided, the photocatalytic sheets 4*b* provided in the plurality of photocatalytic filters 4 can have the same configuration and the photocatalytic sheet 4*b* provided in at least one photocatalytic filter 4 can have a different configuration. In the case of the photocatalytic sheets 4*b* having different configurations, for example, the photocatalytic sheet 4*b* carrying the ultraviolet light responsive photocatalyst 4*b*1 and the photocatalytic sheet 4*b* carrying the visible light responsive photocatalyst 4*b*1 can be used. Further, one photocatalytic sheet 4*b* can carry a plurality of kinds of photocatalysts 4*b*1.

In this case, a part of the plurality of light-emitting elements 3*b* provided in the light source 3 may irradiate light having a peak wavelength smaller than 380 nm and the other light-emitting elements 3*b* may irradiate light having a peak wavelength of 380 nm or more (for example, about 400 nm to 600 nm).

Here, there is a case in which the photocatalytic effect on a specific treatment target (for example, ammonia, ethylene, VOC, bacteria, virus, or the like) may be different in accordance with the type of photocatalyst 4*b*1. For that reason, if one photocatalytic device 1 carries a plurality of kinds of photocatalysts 4*b*1, it is possible to carry the photocatalyst 4*b*1 having a high photocatalytic effect, for example, for each of a plurality of treatment targets. In this way, the versatility of the photocatalytic device 1 can be improved.

Further, there is a case in which a plurality of treatment targets are contained in the gas G. In this case, it is possible to irradiate lights having different wavelengths from a plurality of kinds of light-emitting elements 3*b* to a plurality of kinds of photocatalysts 4*b*1. In this way, it is possible to efficiently treat each treatment target even in the gas G containing a plurality of kinds of treatment targets.

As illustrated in FIGS. 3A and 3B, the photocatalytic filter 4 can include a frame 4*a* and a photocatalytic sheet 4*b*.

The frame 4*a* can have a frame shape and can hold the peripheral edge of the photocatalytic sheet 4*b*. The center portion of the frame 4*a* can be a window portion 4*a*1 through which the photocatalytic sheet 4*b* is exposed. Furthermore, when the area of the photocatalytic sheet 4*b* is large, a beam or the like can be appropriately provided in order to suppress the deflection in the center region of the photocatalytic sheet 4*b*.

A pair of frames 4*a* can be provided. It is possible to hold the photocatalytic sheet 4*b* by sandwiching the photocatalytic sheet 4*b* by the pair of frames 4*a*. In this case, one frame 4*a* can be fixed to the other frame 4*a* by a fastening member 4*a*2 such as a screw. Further, one frame 4*a* may be provided with a protrusion and the other frame 4*a* may be provided with a concave portion fitted to the protrusion. Then, since the protrusion can be fitted to the concave portion when the photocatalytic sheet 4*b* is sandwiched between the pair of frames 4*a*, the pair of frames 4*a* can be fixed to each other. Furthermore, the pair of frames 4*a* may be fixed to each other by ultrasonic welding or the like.

The photocatalytic sheet 4*b* can include, for example, the photocatalyst 4*b*1 and the carrier 4*b*2. The photocatalyst 4*b*1 can have, for example, a granular shape. The photocatalyst 4*b*1 can be appropriately selected in response to the application or the like of the photocatalytic device 1. For example, as described above, the photocatalyst 4*b*1 can be an ultraviolet light responsive photocatalyst or a visible light responsive photocatalyst. The ultraviolet light responsive photocatalyst 4*b*1 can be, for example, titanium oxide or the like. The visible light responsive photocatalyst 4*b*1 can be, for example, tungsten oxide, titanium oxide doped with nitrogen or the like, titanium oxide ion-implanted with a dissimilar metal, or the like.

As will be described later, the carrier 4*b*2 can include, for example, a plurality of weft threads 4*b*2*a* obtained by bundling a plurality of fibers and a plurality of warp threads 4*b*2*b* obtained by bundling a plurality of fibers. The material of the fiber can be, for example, glass. The glass can be, for example, quartz glass, E glass, C glass, S glass, A glass, or the like. Here, the material of the fiber is not limited to glass. As the material of the fiber, one through which light irradiated from the light-emitting element 3*b* passes and which is hardly decomposed by the photocatalytic action can be appropriately selected.

The thickness of the fiber can be set to, for example, about 4 μm to 10 μm. The number of fibers included in one weft thread 4*b*2*a* and one warp thread 4*b*2*b* is not particularly limited, but for example, the number of fibers can be from tens to thousands.

When the weft thread 4*b*2*a* obtained by bundling the plurality of fibers and the warp thread 4*b*2*b* obtained by bundling the plurality of fibers are provided, the plurality of photocatalysts 4*b*1 can be carried between the fiber and the fiber. That is, since the plurality of photocatalysts 4*b*1 are sandwiched between the fiber and the fiber or the plurality of photocatalysts 4*b*1 are absorbed to the fiber, the plurality of photocatalysts 4*b*1 are held by the fiber. In this case, since the number of the fibers can be increased when the thickness of the fiber is thinned, the surface area of the weft thread 4*b*2*a* and the warp thread 4*b*2*b* can be increased. For that reason, when the thickness of the fiber is about 4 μm to 10

μm, the rigidity of the photocatalytic sheet 4b can be maintained and the carried amount of the photocatalyst 4b1 can be increased.

The plurality of photocatalysts 4b1 can be carried by, for example, the carrier 4b2 as below.

First, phosphoric acid or the like is added to pure water to adjust the pH (hydrogen ion concentration) to 2 to 7 so as to produce an aqueous solution.

Next, the plurality of photocatalysts 4b1 are added to the aqueous solution so as to form an emulsion solution.

Next, the carrier 4b2 is immersed into the emulsion solution for about 10 minutes.

Next, the carrier 4b2 is raised from the emulsion solution and is dried.

As described above, the plurality of photocatalysts 4b1 can be carried by the carrier 4b2.

Here, as illustrated in FIG. 2, the gas G flows through the photocatalytic sheet 4b in the thickness direction. In this case, if fibers are woven into a cloth so as to form a carrier, there is concern that pressure loss may be increased and the flow of gas G may be disturbed. If the flow of the gas G is disturbed, there is concern that the photocatalytic effect may decrease. In this case, a plurality of holes can be processed in the carrier formed by weaving fibers in a cloth shape so as to provide the circulation port of the gas G. Incidentally, if the circulation ports of the gas G are provided by processing the plurality of holes, there is concern that the strength of the carrier may be decreased or the fiber of the hole processed portion may be frayed.

Figure 4:
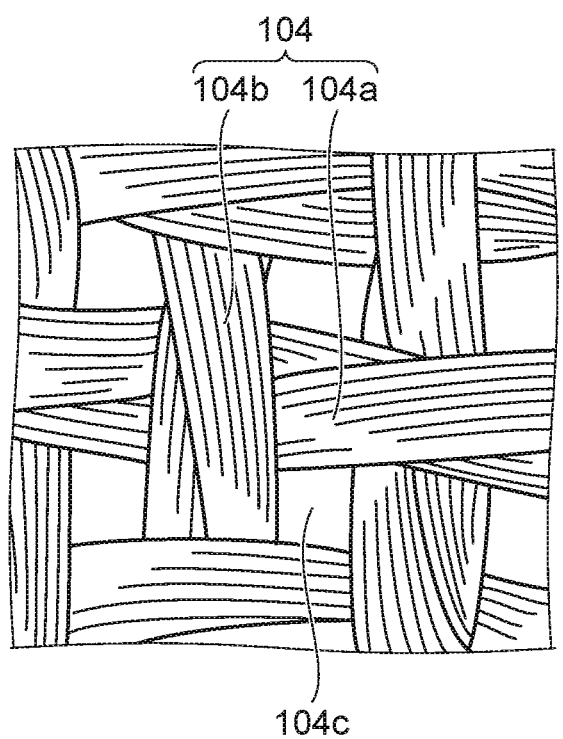
FIG. 4 is a schematic enlarged view illustrating a carrier according to a comparative example.

FIG. 4 is a schematic enlarged view illustrating a carrier 104 according to a comparative example.

As illustrated in FIG. 4, the carrier 104 includes a plurality of weft threads 104a obtained by bundling a plurality of fibers and a plurality of warp threads 104b obtained by bundling a plurality of fibers. For example, the warp thread 104b extends in a direction intersecting the extension direction of the weft thread 104a. The plurality of weft threads 104a are provided at a predetermined interval. The plurality of warp threads 104b are provided at a predetermined interval. For that reason, a space 104c is provided in a region defined by two adjacent weft threads 104a and two adjacent warp threads 104b. That is, the carrier 104 is provided with the plurality of spaces 104c arranged in a matrix shape. Since the plurality of spaces 104c become the circulation ports of the gas G if the plurality of spaces 104c are provided, pressure loss can be reduced.

Incidentally, as illustrated in FIG. 4, the weft thread 104a passes above or below the warp thread 104b at the intersection portion between the weft thread 104a and the warp thread 104b. Similarly, the warp thread 104b passes above or below the weft thread 104a. That is, the weft thread 104a and the warp thread 104b are in a contact state, but are not in a held state. For that reason, there is concern that the position of the weft thread 104a or the position of the warp thread 104b may be shifted when an external force or vibration is applied to the carrier 104. When the position of the weft thread 104a or the position of the warp thread 104b is shifted, the area of the space 104c changes. Accordingly, there is concern that a portion having large pressure loss and a portion having small pressure loss can be generated. When there is a distribution of pressure loss, the flow of the gas G is easily disturbed. Accordingly, there is concern that the photocatalytic effect decreases.

Figure 5A:
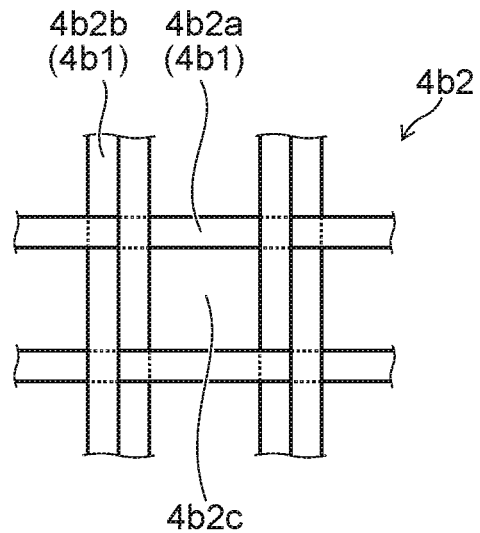
FIGS. 5A to 5C are schematic enlarged views illustrating a carrier according to the embodiment.
Figure 5B:
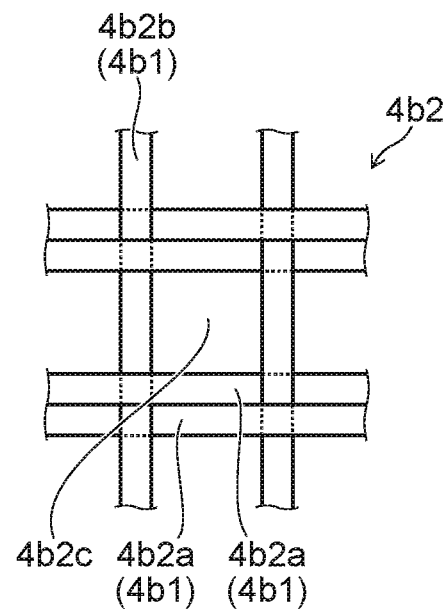
Figure 5C:
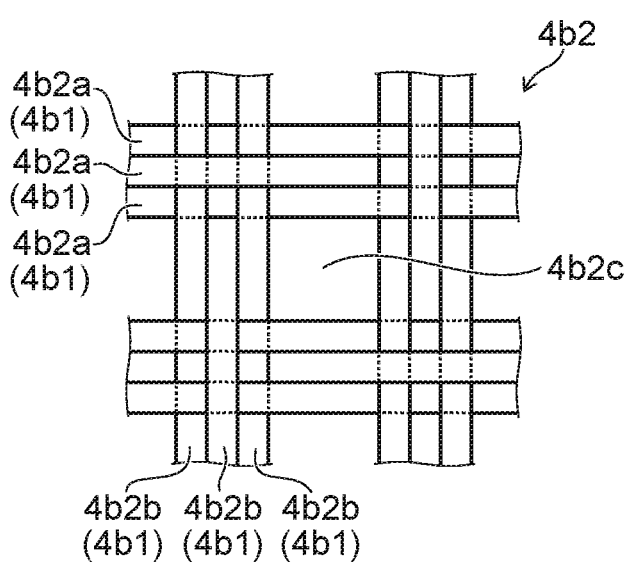

FIGS. 5A to 5C are schematic enlarged views illustrating the carrier 4b2 according to the embodiment.

As illustrated in FIGS. 5A to 5C, the carrier 4b2 can include a plurality of weft threads 4b2a obtained by bundling a plurality of fibers and a plurality of warp threads 4b2b obtained by bundling a plurality of fibers. For example, the warp thread 4b2b extends in a direction intersecting the extension direction of the weft thread 4b2a. Further, the space 4b2c is provided in a region defined by two adjacent weft threads 4b2a and two adjacent warp threads 4b2b. That is, the carrier 4b2 is provided with the plurality of spaces 4b2c arranged in a matrix shape. If the plurality of spaces 4b2c are provided, the plurality of spaces 4b2c become the circulation ports of the gas G and hence pressure loss can be reduced. Further, since the plurality of holes are not processed, it is possible to suppress a decrease in strength of the carrier 4b2 or fraying of the fiber.

Further, as illustrated in FIGS. 5A and 5C, the plurality of warp threads 4b2b can sandwich the weft thread 4b2a at the intersection portion between the weft thread 4b2a and the warp thread 4b2b.

As illustrated in FIGS. 5B and 5C, the plurality of weft threads 4b2a can sandwich the warp thread 4b2b at the intersection portion between the weft thread 4b2a and the warp thread 4b2b. Since the weft thread 4b2a and the warp thread 4b2b are held in this way, it is possible to suppress the position of the weft thread 4b2a and the position of the warp thread 4b2b from being shifted even when an external force or vibration is applied to the carrier 4b2. For that reason, since it is possible to suppress the distribution of pressure loss, it is possible to suppress the disturbance of the flow of the gas G. Further, since the intersection portion between the weft thread 4b2a and the warp thread 4b2b is three-dimensional, it is possible to increase the amount of the photocatalyst 4b1 carried by this portion.

For that reason, it is possible to reduce pressure loss in the carrier 4b2 according to the embodiment. Further, it is possible to improve the photocatalytic effect.

As described above, each of the plurality of weft threads 4b2a can include a plurality of fibers extending in a first direction. Each of the plurality of warp threads 4b2b can include a plurality of fibers extending in a second direction intersecting the first direction.

Then, at least two warp threads 4b2b sandwich at least one weft thread 4b2a or at least two weft threads 4b2a sandwich at least one warp thread 4b2b at the intersection portion between the weft thread 4b2a and the warp thread 4b2b.

Figure 6:
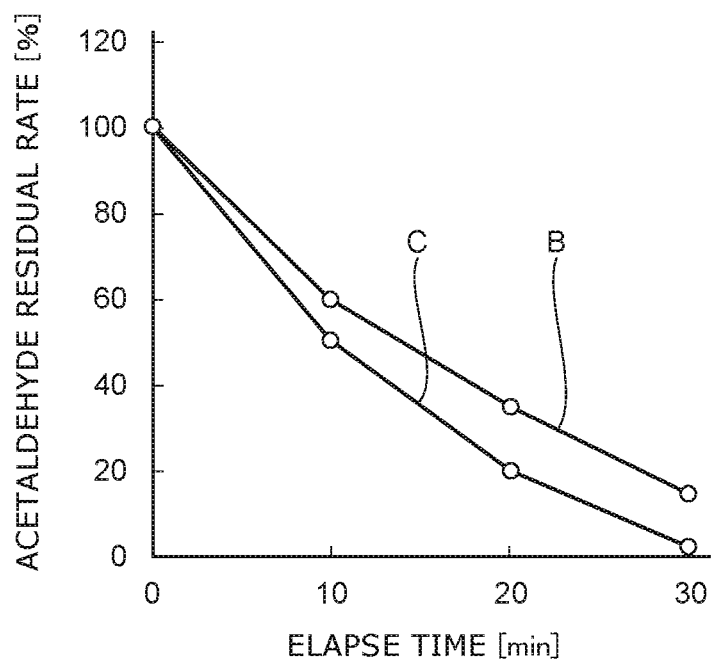
FIG. 6 is a graph illustrating an effect of the photocatalytic filter according to the embodiment.

FIG. 6 is a graph illustrating an effect of the photocatalytic filter 4 according to the embodiment.

"B" in FIG. 6 indicates the case of the photocatalytic filter including the carrier 104 of the comparative example illustrated in FIG. 4. "C" in FIG. 6 indicates the case of the photocatalytic filter 4 including the carrier 4b2 according to the embodiment illustrated in FIG. 5C.

As understood from FIG. 6, the photocatalytic effect can be improved in the photocatalytic filter 4 according to the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A photocatalytic filter for a photocatalytic device comprising:
   a plurality of weft threads each of which includes a plurality of fibers extending in a first direction;
   a plurality of warp threads each of which includes a plurality of fibers extending in a second direction intersecting the first direction; and
   a plurality of photocatalysts which are carried by the plurality of weft threads and the plurality of warp threads, the plurality of photocatalysts being carried between a first fiber and a second fiber in the plurality of weft threads, the plurality of photocatalysts being carried between a first fiber and a second fiber in the plurality of warp threads, and the plurality of photocatalysts being at least one of titanium oxide, tungsten oxide, titanium oxide doped with nitrogen, and titanium oxide ion-implanted with a dissimilar metal,
   at least two warp threads sandwiching at least one weft thread or at least two weft threads sandwiching at least one warp thread at an intersection portion between the weft thread and the warp thread.

2. The filter according to claim 1, wherein a space is provided in a region defined by two adjacent weft threads and two adjacent warp threads.

3. The filter according to claim 2, wherein the space allows gas to flow therethrough.

4. The filter according to claim 1, wherein each of the plurality of fibers contains glass.

5. The filter according to claim 1, wherein each of the plurality of fibers is translucent.

6. The filter according to claim 1, wherein a thickness of each of the plurality of fibers is equal to or larger than 4 μm and equal to or smaller than 10 μm.

7. The filter according to claim 1, wherein the plurality of fibers are bundled in the plurality of weft threads.

8. The filter according to claim 1, wherein the plurality of fibers are bundled in the plurality of warp threads.

9. The filter according to claim 1, wherein at least two warp threads sandwich at least one weft thread to hold the at least one weft thread.

10. The filter according to claim 1, wherein at least two weft threads sandwich at least one warp thread to hold the at least one warp thread.

11. A photocatalytic device comprising:
    at least one photocatalytic filter according to claim 1; and
    a light source which includes a substrate and a plurality of light-emitting elements provided on the substrate and capable of irradiating light to a photocatalyst carried by the at least one photocatalytic filter.

12. The device according to claim 11, wherein the substrate is provided with a plurality of holes penetrating the substrate in a thickness direction.

13. The device according to claim 12, wherein a diameter of the plurality of holes is equal to or larger than 3 mm and equal to or smaller than 4 mm.

14. The device according to claim 11, wherein the plurality of light-emitting elements are able to irradiate light having a peak wavelength of 380 nm or more.

15. The device according to claim 11, wherein a part of the plurality of light-emitting elements are able to irradiate light having a peak wavelength smaller than 380 nm and other of the plurality of light-emitting elements are able to irradiate light having a peak wavelength of 380 nm or more.

16. The device according to claim 11, wherein the plurality of light-emitting elements are provided on both surfaces of the substrate.

17. The device according to claim 16,
    wherein the at least one photocatalytic filter includes a plurality of photocatalytic filters, and
    the substrate is provided between a first photocatalytic filter and a second photocatalytic filter.

* * * * *